United States Patent [19]

Pearlman

[11] Patent Number: 5,355,119
[45] Date of Patent: Oct. 11, 1994

[54] APPARATUS AND METHODS FOR CONTROLLING A SIGNAL DEVICE

[75] Inventor: Barry S. Pearlman, Chesterfield, Mo.

[73] Assignee: Public Safety Equipment, Inc., St. Louis, Mo.

[21] Appl. No.: 629,070

[22] Filed: Dec. 14, 1990

Related U.S. Application Data

[63] Continuation of Ser. No. 246,976, Sep. 20, 1988, abandoned.

[51] Int. Cl.$^5$ .............................................. G08B 5/00
[52] U.S. Cl. .............................. 340/468; 340/471; 340/472; 340/331
[58] Field of Search .............. 340/331, 471, 468, 472, 340/477, 478, 825.06; 315/81, 82, 83, 200 A; 307/10.8, 10 AT

[56] References Cited

U.S. PATENT DOCUMENTS

| | | | |
|---|---|---|---|
| 2,891,195 | 6/1959 | Smyth | 315/159 |
| 3,130,349 | 4/1964 | Mallory | 315/151 |
| 3,247,402 | 4/1966 | Hayden | 307/132 |
| 3,474,410 | 10/1969 | Ivec | 340/82 |
| 3,584,257 | 6/1971 | Adams | 315/205 |
| 3,618,011 | 11/1971 | Leeder, Jr. | 340/80 |
| 3,631,359 | 12/1971 | Jones | 331/75 |
| 3,660,674 | 5/1972 | Bolinger | 307/202 |
| 3,710,185 | 1/1973 | Switsen | 315/240 |
| 3,801,866 | 4/1974 | Schmidgall | 315/200 A |
| 3,893,041 | 7/1975 | Foster et al. | 331/45 |
| 3,908,179 | 9/1975 | Heehler et al. | 340/81 R |
| 4,114,071 | 9/1978 | Thrower, Jr. et al. | 315/226 |
| 4,149,113 | 4/1979 | Sammis | 315/219 |
| 4,232,305 | 11/1980 | Lelaidier et al. | 340/384 E |
| 4,249,160 | 2/1981 | Chilvers | 340/33 |
| 4,255,749 | 3/1981 | Henry | 340/706 |
| 4,270,074 | 5/1981 | Duckworth et al. | 318/254 |
| 4,280,123 | 7/1981 | Right et al. | 340/384 E |
| 4,284,974 | 8/1981 | Ishida et al. | 340/81 |
| 4,309,639 | 1/1982 | Thrower, Jr. et al. | 315/82 |
| 4,388,614 | 6/1983 | Pezzillo et al. | 340/384 E |
| 4,417,189 | 11/1983 | Overfield | 318/254 |
| 4,555,690 | 11/1985 | Fukushima et al. | 340/329 |
| 4,556,862 | 12/1985 | Meinershagen | 340/478 |
| 4,595,978 | 6/1986 | Sheffield | 340/331 |
| 4,663,609 | 5/1987 | Rosario | 340/724 |
| 4,712,044 | 12/1987 | Phillips | 340/478 |
| 4,791,402 | 12/1988 | Vaugn | 340/468 |
| 4,831,357 | 5/1989 | Miller | 340/472 |

FOREIGN PATENT DOCUMENTS

| | | |
|---|---|---|
| 739583 | 7/1966 | Canada . |
| 2185305A | 7/1987 | United Kingdom . |
| WO84/04073 | 10/1984 | World Int. Prop. O. . |

OTHER PUBLICATIONS

Unitrol Quadra-Speed Flashers, Modulting Patterns, 2 pgs.
Unitrol Emergency Vehicle Electronic Products, System 80K–System Pricing, Dunbar–Nunn Corporation, 2 pgs.
Installation Instructions, Unitrol Quadra–Speed Flashers, Dunbar–Nunn Corporation, 4 pgs.
Sound Off, Inc., Emergency Technology, Inc., Suggested Retail Price Sheet, Jul. 1, 1987, 4 pgs.
Unitrol Quadra–Speed Flashers, A High–Powered, Low–Cost Warning System for Emergency Vehicles, catalog, 4 pgs.
"Emergency Vehicle Lighting and Electronics", product catalog ATI Approved Technology, Inc., 6 pgs.
ETM Electronic Modulating System, product catalog, Sound Off, Inc. Emergency Technology, Inc., 2 pgs.

*Primary Examiner*—Donald J. Yusko
*Assistant Examiner*—John Giust
*Attorney, Agent, or Firm*—Senniger, Powers, Leavitt & Roedel

[57] ABSTRACT

Apparatus and method for controlling a signal device for energization by an electrical source. The apparatus includes circuitry for producing digital cycles on an output line wherein each digital cycle includes a sequence of pulses and spaces, each cycle having at least two pulses that differ in duration and at least two spaces that differ in duration. The apparatus also includes circuitry connected to the output line and responsive to the circuitry for producing the digital cycles for applying electrical energization from the electrical source to the signal device in accordance with the pulses in the digital cycles.

15 Claims, 8 Drawing Sheets

APPARATUS AND METHODS FOR CONTROLLING A SIGNAL DEVICE

This is a continuation of co-pending application Ser. No. 07/246,976 filed on Sep. 20, 1988, now abandoned.

NOTICE

Copyright © 1988 Public Safety Equipment, Inc. A portion of the disclosure of this patent document contains material which is subject to copyright protection. The copyright owner has no objection to the facsimile reproduction by anyone of tile patent document or the patent disclosure, as it appears in the Patent and Trademark Office patent file or records, but otherwise reserves all copyright rights whatsoever.

BACKGROUND OF THE INVENTION

The present invention relates to apparatus and methods for controlling electrical energization of one or more signal devices and more particularly to circuits and methods for electrically energizing signal devices in one or more different energization patterns.

Without limiting the scope of intended applications of tile inventive apparatus for producing visual, acoustic, radio and other signals from signal sources in stationary or mobile environments, the background of the invention is described in connection with the field of emergency vehicle warning lights. Warning lights are utilized on many different types of vehicles such as police cars, fire trucks, ambulances, tow trucks, and utility trucks to visually indicate their presence during emergencies. The warning lights may include light sources mounted in a light bar which is installed on the exterior of the vehicle as we]l as head lights and tail lights, for instance.

Prior emergency vehicle warning light control circuits typically produce warning flashes consisting of an ON period followed by an OFF period of little or no intensity. These two periods comprise one cycle and the cycle is repeated continuously. The flash rate of the warning lights may be adjusted. The "flash rate" is defined as the number of ON periods per minute. The flash duration of the ON period for the warning lamps may also be adjusted. A circuit having both an adjustable flash rate and duration is disclosed in U.S. Pat. No. 3,584,257.

The ability of signal apparatus to attract attention and encourage cooperation with authorized personnel is important to the safety of the general public. Signals which are only moderately conspicuous or which diminish in noticeability or psychological conspicuity over a period of years as the public becomes increasingly familiar with them are potentially less effective in preventing injuries and fatalities. Accordingly, in emergency vehicle and other applications it is desirable to provide warning signals that provide a new dimension of noticeability and conspicuity in various emergency and other conditions.

SUMMARY OF THE INVENTION

Among the objects of the present invention are to provide improved apparatus and methods for controlling energization of a signal device for augmented noticeability and conspicuity; to provide improved apparatus and methods for greater flexibility and convenience of operation of signal apparatus; to provide improved signal apparatus which is conveniently installed in emergency vehicles and other mobile or stationary environments; and to provide improved circuits which are uncomplicated in structure and reliable in operation.

In general, one form of inventive apparatus for controlling a signal device for energization by an electrical source includes first circuitry for producing digital cycles on an output line wherein each digital cycle includes a sequence of pulses and spaces, each cycle having at least two pulses that differ in duration and at least two spaces that differ in duration. Further circuitry is connected to the output line and responds to the first circuitry. The further circuitry applies electrical energization from the electrical source to the signal device in accordance with the pulses in the digital cycles.

In another form of the invention an apparatus for controlling a signal device for energization by an electrical source includes circuitry for producing digital cycles on an output line wherein each digital cycle includes a sequence of pulses, each cycle having at least two differing subperiods and every subperiod exceeds one-tenth second. Further circuitry is connected to the output line and applies electrical energization from the electrical source to the signal device in accordance with the pulses in the digital cycles.

The invention also involves an apparatus for controlling at least two signal devices powered by an electrical source. Circuitry produces different first and second concurrent digital cycles wherein the first digital cycle includes a sequence of pulses and spaces and at least two of the pulses differ in duration. Further circuitry concurrently applies electrical energization from the electrical source to the two signal devices of the signal apparatus in accordance with the pulses of the concurrent digital cycles.

In still another form of the inventive apparatus for controlling at least two signal devices powered by an electrical source, circuitry produces different first and second concurrent digital cycles wherein the first digital cycle includes a sequence of pulses and spaces and at least two of the spaces differ in duration. Further circuitry is provided for concurrently applying electrical energization from the electrical source to the two signal devices in accordance with the pulses of the concurrent digital cycles.

Yet another form of the invention is an apparatus for controlling a signal device for energization by an electrical source and includes a memory for storing a plurality of digital values characteristic of a plurality of different energization patterns, each energization pattern indicating a predetermined condition. The apparatus also comprises means for selecting one of the patterns and circuitry for energizing the signal device in response to the pattern selected.

An additional form of inventive apparatus for controlling electrical energization of a signal device by an electrical source includes sequencing circuitry for producing a sequential electrical output and a memory responsive to the sequential electrical output from the sequencing circuitry for generating a pattern of signals. Further circuitry is connected to the memory for selectively energizing the signal device from the electrical source in accordance with the pattern of signals.

In another additional loren of the invention an apparatus for controlling a signal device for energization by an electrical source includes circuitry for producing digital cycles in different modes in response to a mode input. Further circuitry applies electrical energization from the electrical source to the signal device in accordance with the digital cycles, and the circuitry for applying electrical energization requires power for its own operation from the electrical source. The apparatus also has first switch means for connecting the electrical source to the circuitry for applying electrical energization, and the circuitry for producing digital cycles operates in a first mode when the first switch means is on. In addition, mode shifting switch means selectively connects the electrical source to the mode input to operate the circuitry for producing digital cycles in a different mode. Power is supplied through the mode shifting switch means to the circuitry for applying electrical energization when the mode shifting switch means is on. Unidirectional conduction means connects the mode shifting switch means to the circuitry for applying electrical energization, and independently powers the operation of the circuitry for applying electrical energization through the mode shifting switch means when it shifts to the different mode.

Other apparatus and methods are also described and claimed herein, and other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
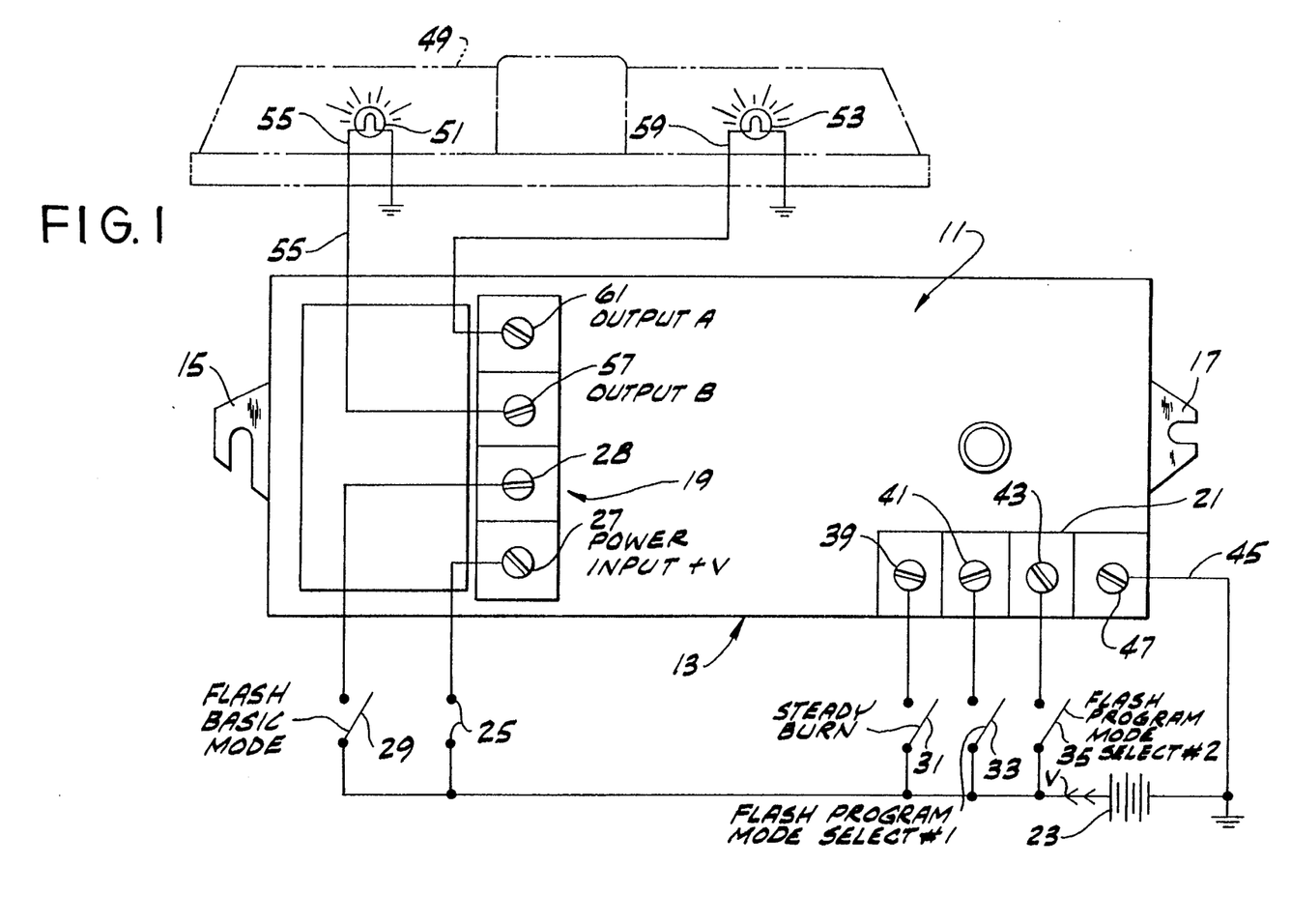
FIG. 1 is an exterior wiring diagram and block diagram of apparatus of the present invention controlling energization of light sources in inventive signal apparatus powered by an electrical battery power source.

A preferred embodiment of an apparatus of the present invention is indicated generally in FIG. 1 and has a control circuit 11. As shown in FIG. 1, the control circuit 11 is encased in a rectangular box-like housing 13 for mounting in an emergency vehicle (not shown) or in a light bar 49 or otherwise with signal devices to be controlled. A pair of tabs 15 and 17 extend from opposite ends of housing 13 which facilitate mounting of the housing 13 in an appropriate location in the vehicle such as under the hood, in the trunk, or under the dashboard.

A pair of terminal blocks 19 and 21 are located on housing 13 for connecting control circuit 11 to various external devices. A voltage of nominally 13.6 volts dc from a battery 23 is supplied through a connector V and a fuse 25, to a terminal 27 of terminal block 19. The dc voltage is supplied to control circuit 11 through switches 29, 31, 33, and 35 via terminals 28, 39, 41, and 43 respectively. A lead 45 connects a terminal 47 of control circuit 11 to a ground return to battery 23.

Switch 29 is marked FLASH BASIC MODE, since it connects the battery 23 to energize control circuit 11 and cause lamp flashing even if all other switches are off or disconnected. Indeed, each switch 29, 31, 33 and 35 energizes control circuit 11 in some mode even if all other switches are off or disconnected. In this way each switch is used to maximum operational advantage. Switch 31 is marked STEADY BURN, since it causes control circuit 11 to energize both an OUTPUT A and OUTPUT B continuously. Switches 33 and 35 are marked FLASH PROGRAM MODE SELECT #1 and FLASH PROGRAM MODE SELECT #2 respectively, since they together binarily select each of four stored programs or patterns of output energization available in this illustrative embodiment of control circuit 11.

The control circuit 11 is thus highly versatile. The switches are suitably marked or named in different ways suggestive of the application or environment of use. For example, alternative switch labeling in various applications are shown in the Switch Labeling Chart herein. In a first general application General I, the switches 29, 31, 33 and 35 are marked as shown in the FIGS. 1, 2 and 7.

| | SWITCH LABELING CHART | | | |
|---|---|---|---|---|
| Application | Sw. 29 | Sw. 31 | Sw. 33 | Sw. 35 |
| General I | Flash Basic Mode | Steady Burn | Flash Program Mode Select #1 | Flash Program Mode Select #2 |
| General II | Flash OFF-ON | FLOOD | STOP | Program Shift |
| Ambulance | FLASH | STEADY | ON-OFF - CODE BLUE OFF-ON - CODE GREEN ON-ON - CODE RED | |
| Police | WARN | TAKEDOWN | PURSUIT | STOP |
| Truck | OFF-ON | — | LIGHTS FRONT-REAR | FLASH-STEADY |

In another general application, General II, a FLASH OFF-ON label for switch 29 indicates that the flashing is off or on. Switch 31 is labeled FLOOD for steady full-intensity illumination. Switch 33 is interpreted as a flash mode warning nearby vehicles to "Stop" for the emergency vehicle equipped with the invention. Switch 35 is interpreted as a temporary "Program Shift" for further attracting attention.

In an ambulance application, activating switch 29 starts a "Flash" mode. Pressing switch 31 produces a "Steady" illumination. Three combinations of switches 33 and 35 produce various Code signals indicative of patient status, ambulance arrival status or personnel status.

In a police application, switch 29 is labelled for a "Warn" mode. Switch 31 provides a TAKEDOWN lighting mode for illuminating an incident scene. Switch 33 provides a signal indicative of pursuit by the police vehicle. Switch 35 is a highly conspicuous pattern commanding a pursued vehicle or suspect to "Stop".

In a fire truck application, switch 31 is omitted. Switch 29 is an off-on switch for the unit. Switch 33 selects front or rear lights when switch 29 is on. Switch 35 selects a flashing or steady burn mode for the lights selected by switch 33 when switch 29 is on.

The applications listed are nonexhaustive and numerous other switch designations and uses of the invention are implemented by the skilled worker in the practice of the invention to meet the needs of these and various other applications.

A warning signal assembly, such as a light bar 49 of FIG. 1 mounted on the roof the emergency vehicle, includes a pair of electrical light sources or signal devices provided as incandescent lamps 51 and 53. Lamp 51 is connected to control circuit 11 by a lead 55 to an OUTPUT B terminal 57. Similarly, lamp 53 is connected to control circuit 11 by a lead 59 to an OUTPUT A terminal 61. Grill lights, headlights, tail lights, and marker and other vehicle lights are also suitably controlled in the practice of the invention. Selection of particular lights instead of others in various modes is suitably accomplished by connecting some lights to output A and other lights to output B. Switches (not shown) connected to various lights and ganged to one or more of switches 29, 31, 33 and 35 provide other mode-specific light combinations in other embodiments. Either separate or ganged control of rotating lights, reflectors or lenses is provided for each mode to suit each application. A signal apparatus with switchable rotating reflectors is shown for instance, in coassigned U.S. Pat. No. 4,701,743. Acoustic and other warning signal devices are also readily controlled from OUTPUT A and OUTPUT B.

Figure 2:
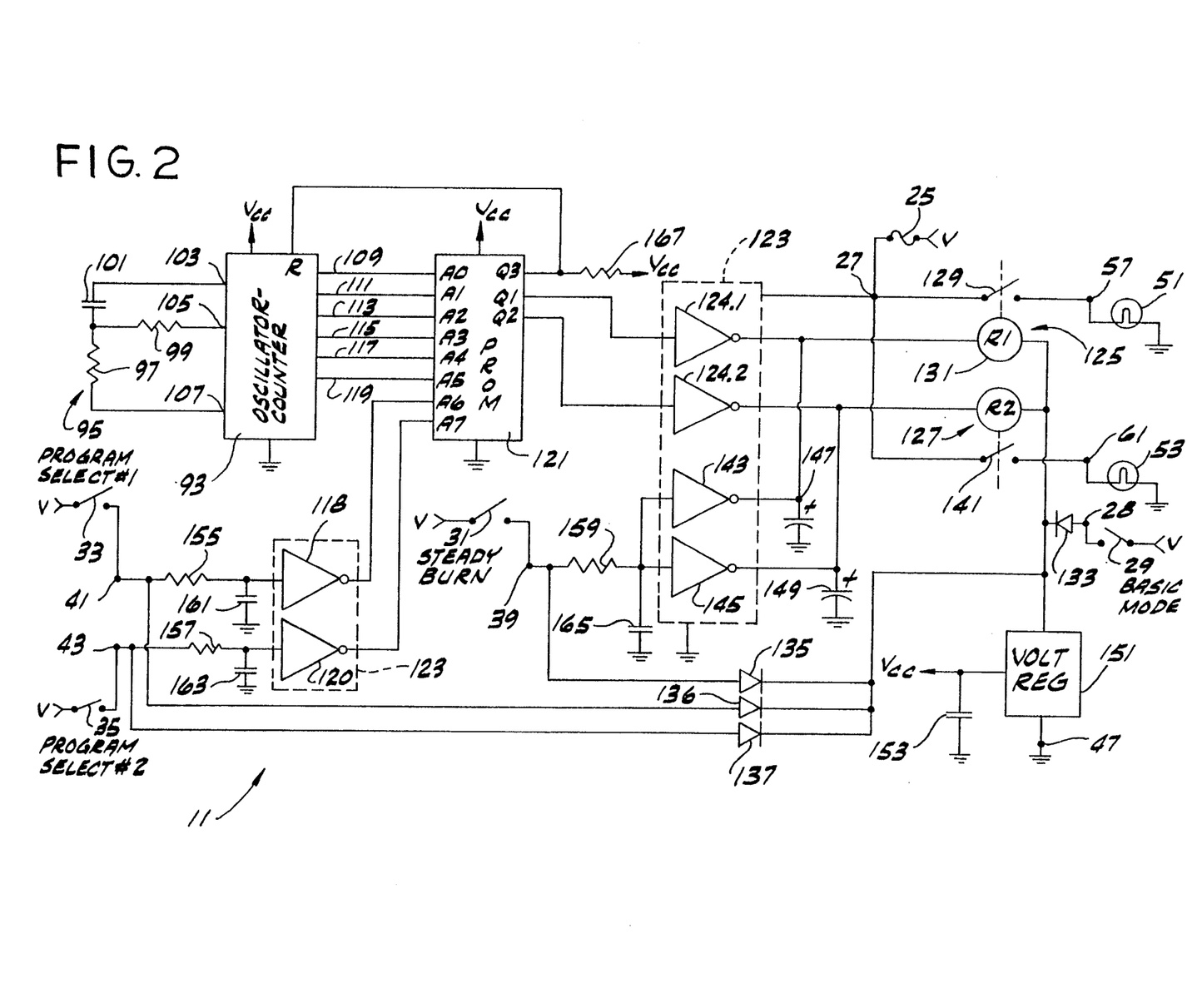
FIG. 2 is a more detailed electrical schematic diagram of the inventive apparatus of FIG. 1.

In FIG. 2, control circuit 11 has a binary counter 93 which includes an internal oscillator. An RC network 95 has two resistors 97 and 99 and a capacitor 101 connected to each other and to counter pins 107, 105, and 103 respectively. The operating frequency of the internal oscillator is determined by selecting appropriate values for resistors 97 and 99 and capacitor 101. Binary counter 93 and RC network 95 constitute an example of a sequencing means for producing a sequential electrical output and repeating it. In FIG. 2 this output is binary—000000, 000001, 000010, 000011, and so on. Although a binary counter is used in this preferred embodiment, other sequencing means such as a decade counter, a shift register, or any circuit which can produce a sequential output may be used.

The binary counter outputs 109, 111, 113, 115, 117, and 119 thus count in binary order at a rate set by the internal oscillator for input to a memory device 121, such as a bipolar fusible link Programmable Read Only Memory (PROM). Stored in memory device 121 are a plurality of digital values or bits which are representative of pulses and spaces or characteristic of a plurality of different energization patterns. Memory device 121 constitutes an example of a memory means for storing a plurality of digital values representative of a plurality of the pulses and spaces. Although a PROM is used in this preferred embodiment, other memory devices are also suitable, such as a ROM (Read Only Memory) or an EPROM (Erasable Programmable Read Only Memory), an EAROM (Electrically Alterable Read Only Memory) or any other memory means implemented in semiconductor form, magnetic bubble technology or any other suitable technology. Six address inputs A0-A5 of memory device 121 are respectively connected to the outputs 109-119 of binary counter 93. Memory device 121 has two additional address inputs A6 and A7 each of which acts as a mode input. A pair of inverters 118 and 120 connected to inputs A6 and A7. Inverters 118 and 120 are suitably open-collector devices for sinking current from inputs A6 and A7, wherein PROM 121 is illustratively a TTL (Transistor-Transistor-Logic) device.

Memory device 121 has a set of Q outputs equal in number to the number of bits which are addressable simultaneously in the memory. Two of tile outputs Q1 and Q2 of memory device 121 are connected to an open collector inverting buffer device 123 that includes inverters 124.1 and 124.2, which have sufficient current carrying capacity to drive a pair of relays 125 and 127 respectively. Relays 125 and 127 each constitute an example of a means for applying energization to the lamps 51 and 53 respectively. It is to be noted that although relays 125 and 127 are shown in this preferred embodiment, other current switching devices are suitable, such as a power FET (Field Effect Transistor), PNP or NPN bipolar transistor, insulated gate transistor (IGT), silicon controlled restifier (SCR) or any other effective switching device for applying electrical energization from a power source to one or more signal devices such as the lamps.

When a logical "1", which represents a pulse, is present at the Q1 output line, buffer device 123 causes contact 129 of relay 125 to close. This occurs because Q1 high makes inverter 124.1 sink current through the coil 131 of relay 125. The current for each relay coil is available from battery terminal V and passes through any one or more of switches 29, 31, 33 and 35 (when closed) via a set of diodes 133, 135, 136 and 137 which are wire-ORed at the cathodes to both coils of relays 125 and 127. The diodes act as an example of unidirectional conduction means for independently powering the relays and circuitry through any of the switches regardless of which one or more of switches 29, 31, 33 and 35 is on. The unidirectional aspect prevents unintended mode select voltages from arising. Contact 129 is connected between terminals 27 and 57 so that when contact 129 closes, current is supplied to energize lamp 51. Likewise, if a logic "1" is present at output Q2 of memory 121, buffer device 123 causes a contact 141 of relay 127 to close. Contact 141 is connected between terminals 27 and 61 so that when contact 141 closes, current is supplied to energize lamp 53. If, however, a logic "0", which represents a space, is present at output Q1, buffer device 123 sinks no current. Contact 129 of relay 125 opens or remains open and lamp 51 is extinguished. A logic "0" at output Q2 similarly extinguishes lamp 53.

A further pair of inverters 143 and 145 are included in buffer 123 to override the flashing of lamps 51 and 53 when switch 31 is closed. With switch 31 closed, inverters 143 and 145 sink current for both of the relays 125 and 127. Both contacts 129 and 141 close and energize lamps 51 and 53 for continual illumination, as in the STEADY BURN state. A capacitor 147 is connected to the output of inverter 143 and a capacitor 149 is connected to the output of inverter 145 to suppress any noise that may be generated whenever relays 125 and 127 open.

Resistors 155, 157 and 159 and shunt capacitors 161, 163 and 165 form three low pass filters to prevent extraneous energy, such as RFI (Radio Frequency Interference) or EMI (Electro-Magnetic Interference) from interfering with the operation of control circuit 11. Resistor 159 is connected from switch 31 and terminal 39 to the inputs of both inverters 143 and 145. Resistor 155 is connected from switch 33 and terminal 41 to the input of inverter 118. Resistor 157 is connected from switch 35 and terminal 43 to the input of inverter 120. Capacitors 161 and 163 are respectively connected in shunt across the inputs of inverters 118 and 120. Capacitor 165 shunts both inverters 143 and 145 at their inputs.

Integrated circuit 151 supplies a regulated voltage Vcc for binary counter 93 and memory device 121. Circuit 151 receives unregulated voltage from a line connected to the cathodes of diodes 133, 135, 136 and 137. Thus, if all of the switches 29, 31, 33 and 35 are off, the circuit 151 is automatically off. A ground return for circuit 151 is made to terminal 47. A capacitor 153 bypasses electrical interference on the Vcc voltage line.

An example of operation of control circuit 11 is now described. Basic Mode switch 29 is closed and switch 31 is open (no Steady Burn). Stored in memory device 121 are a plurality of digital values characteristic of a plurality of different energization patterns for control of lamps 51 and 53. Switches 33 and 35 are each open or closed in one of 4 possible permutations to select one of the patterns stored in memory device 121. Switches 29, 33 and 35 thus constitute an example of a means for selecting one of the patterns. Put another way, the inputs A6 and A7 identify 4 blocks of addresses in a memory map. Each pattern is in a particular block of addresses selected by switches 33 and 35 for sequential access by counter 93. Counter 93 asserts binary addresses one by one in sequence to memory 121.

In a given pattern tile ones and zeros stored in memory locations corresponding to addresses A0-A5 are retrieved in sequence and fed to outputs Q1 and Q2 whereupon the relays and lamps are correspondingly energized and deenergized concurrently. The memory 121 thus produces a sequence of pulses and spaces on each output line such as Q1. Put another way, counter 93 repeatedly produces a sequence of binary values on lines 109-119. Consequently, a sequence of memory addresses is repeatedly asserted on lines A0-A5, causing the pulses and spaces on output line Q1 to be produced in cycles, herein referred to as digital cycles - The repetition rate of the digital cycles depends on the frequency of the oscillator in counter 93, which frequency is established by capacitor 101 and resistors 95 and 97. The pulse(s) and spaces(s) in each digital cycle are determined in number and length by the digital bits, or patterns, stored in memory 121. In this way, counter 93 and memory 121 act as an example of a means for producing concurrent digital cycles on an output line wherein each digital cycle includes a sequence of pulses and spaces. Advantageously, the digital cycles can be made different according to any program the skilled worker elects to store in memory 121.

For example, a logic one or zero is illustratively understood to stand for a pulse or space respectively in the FIG. 2 embodiment. The length of a given pulse or space is established by the number of consecutive logic ones or consecutive logic zeros for it in the memory, assuming the counter 93 rate is constant. (In FIG. 7, this assumption is lifted.)

Each digital value is regarded as a number represented by the set of bits stored at a given address in memory 121. When that address is asserted, the first bit in the digital value is supplied to output Q1 and the second bit in the same digital value is concurrently supplied to output Q2.

The length of each digital cycle which is repeated at the memory output is established by the length of its pattern in memory. The length of each pattern in address space is equal to the number of addresses accessed in the counting process. In this embodiment of FIG. 2 the maximum length of each pattern is an integral power of two, e.g. 64, since there are six address lines A0-A5 for each pattern. The maximum length of a stored pattern may be increased by providing more output lines from counter 93 and adding more memory devices.

In general, a desired pattern length can be different from the maximum length. To program patterns of any length, a counter reset control bit is programmed to reset binary counter 93 when each digital cycle or pattern is completed. This reset bit is supplied by an additional output Q3 of memory device 121. Output Q3 is connected to a reset input R of binary counter 93 to restart binary counter 93 when the end of the digital cycle or pattern is encountered. A pullup resistor 167 is connected between output Q3 and voltage Vcc.

Figure 3:
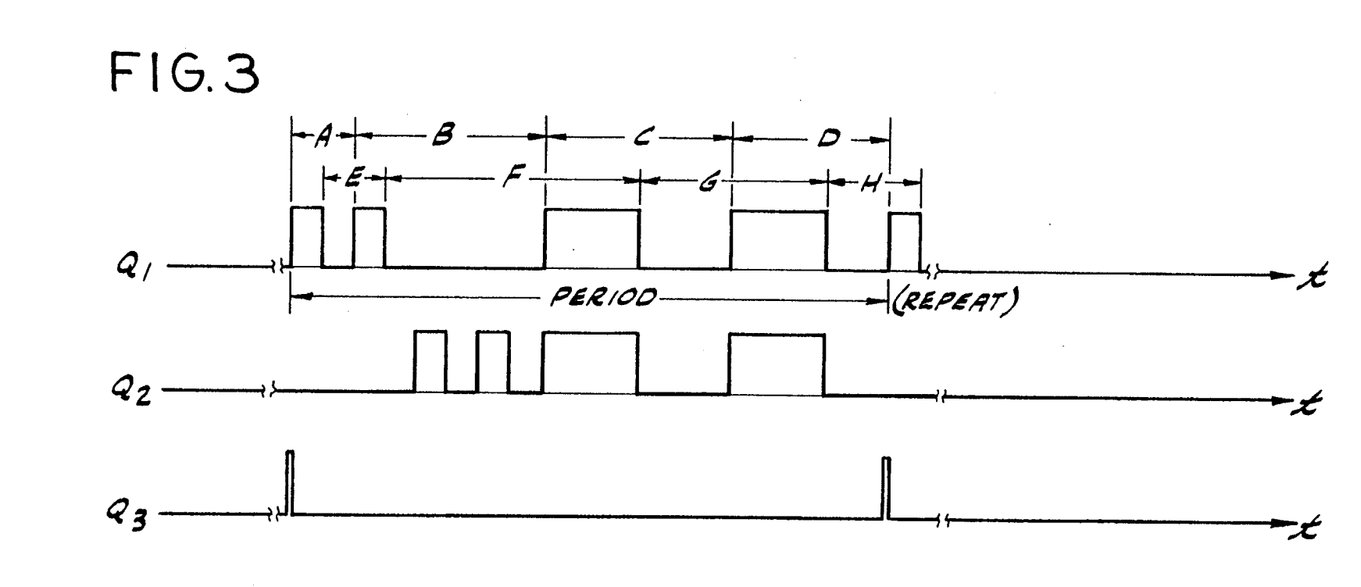
FIGS. 3,4,5, and 6 are voltage waveform diagrams of some illustrative energization patterns stored in and produced from a memory in the inventive apparatus of FIG. 2 according to the inventive methods.

Tables I-IV show the digital bits in the digital values (Q3, Q2, Q1) stored at each memory location in memory device 121 for four different exemplary programs 1-4. For example, Table I corresponds to switches 33 and 35 being open to select program 1. Although the length of program 1 is 64 addresses, the actual pattern length is 19. In Table I output Q1 is a logical "1" and output Q2 is a logical "0" at memory location 0. (The memory location is expressed in binary form by the ROM address inputs at the left of each Table.) Therefore, lamp 51 is energized and lamp 53 is unenergized when operations are at location 0. Q3 is "0" (no reset) and the counter asserts addresses 0-18 in sequence Output Q3 at memory location 19 is a logical "1" which resets binary counter 93 for repeating the stored pattern at locations 0-18 of program 1.

TABLE I

| PROGRAM 1 FOR FIG. 3 | | | | | | | | | | |
|---|---|---|---|---|---|---|---|---|---|---|
| ROM Address Inputs | | | | | | | | ROM Outputs | | |
| $A_7$ | $A_6$ | $A_5$ | $A_4$ | $A_3$ | $A_2$ | $A_1$ | $A_0$ | $Q_3$ | $Q_2$ | $Q_1$ |
| 0 | 0 | 0 | 0 | 0 | 0 | 0 | 0 | 0 | 0 | 1 |
| 0 | 0 | 0 | 0 | 0 | 0 | 0 | 1 | 0 | 0 | 0 |
| 0 | 0 | 0 | 0 | 0 | 0 | 1 | 0 | 0 | 0 | 1 |
| 0 | 0 | 0 | 0 | 0 | 0 | 1 | 1 | 0 | 0 | 0 |
| 0 | 0 | 0 | 0 | 0 | 1 | 0 | 0 | 0 | 1 | 0 |
| 0 | 0 | 0 | 0 | 0 | 1 | 0 | 1 | 0 | 0 | 0 |
| 0 | 0 | 0 | 0 | 0 | 1 | 1 | 0 | 0 | 1 | 0 |
| 0 | 0 | 0 | 0 | 0 | 1 | 1 | 1 | 0 | 0 | 0 |
| 0 | 0 | 0 | 0 | 1 | 0 | 0 | 0 | 0 | 1 | 1 |
| 0 | 0 | 0 | 0 | 1 | 0 | 0 | 1 | 0 | 1 | 1 |
| 0 | 0 | 0 | 0 | 1 | 0 | 1 | 0 | 0 | 1 | 1 |
| 0 | 0 | 0 | 0 | 1 | 0 | 1 | 1 | 0 | 0 | 0 |
| 0 | 0 | 0 | 0 | 1 | 1 | 0 | 0 | 0 | 0 | 0 |
| 0 | 0 | 0 | 0 | 1 | 1 | 0 | 1 | 0 | 0 | 0 |
| 0 | 0 | 0 | 0 | 1 | 1 | 1 | 0 | 0 | 1 | 1 |
| 0 | 0 | 0 | 0 | 1 | 1 | 1 | 1 | 0 | 1 | 1 |
| 0 | 0 | 0 | 1 | 0 | 0 | 0 | 0 | 0 | 1 | 1 |
| 0 | 0 | 0 | 1 | 0 | 0 | 0 | 1 | 0 | 0 | 0 |
| 0 | 0 | 0 | 1 | 0 | 0 | 1 | 0 | 0 | 0 | 0 |
| 0 | 0 | 0 | 1 | 0 | 0 | 1 | 1 | 1 | 0 | 0 |
| 0 | 0 | 0 | 1 | 0 | 1 | 0 | 0 | 1 | 0 | 0 |
| 0 | 0 | 0 | 1 | 0 | 1 | 0 | 1 | 1 | 0 | 0 |
| 0 | 0 | 0 | 1 | 0 | 1 | 1 | 0 | 1 | 0 | 0 |
| 0 | 0 | 0 | 1 | 0 | 1 | 1 | 1 | 1 | 0 | 0 |
| 0 | 0 | 0 | 1 | 1 | 0 | 0 | 0 | 1 | 0 | 0 |
| 0 | 0 | 0 | 1 | 1 | 0 | 0 | 1 | 1 | 0 | 0 |
| 0 | 0 | 0 | 1 | 1 | 0 | 1 | 0 | 1 | 0 | 0 |
| 0 | 0 | 0 | 1 | 1 | 0 | 1 | 1 | 1 | 0 | 0 |
| 0 | 0 | 0 | 1 | 1 | 1 | 0 | 0 | 1 | 0 | 0 |

TABLE I-continued
PROGRAM 1 FOR FIG. 3

| A7 | A6 | A5 | A4 | A3 | A2 | A1 | A0 | Q3 | Q2 | Q1 |
|---|---|---|---|---|---|---|---|---|---|---|
| 0 | 0 | 0 | 1 | 1 | 1 | 0 | 1 | 1 | 0 | 0 |
| 0 | 0 | 0 | 1 | 1 | 1 | 1 | 0 | 1 | 0 | 0 |
| 0 | 0 | 0 | 1 | 1 | 1 | 1 | 1 | 1 | 0 | 0 |
| 0 | 0 | 1 | 0 | 0 | 0 | 0 | 0 | 1 | 0 | 0 |
| 0 | 0 | 1 | 0 | 0 | 0 | 0 | 1 | 1 | 0 | 0 |
| 0 | 0 | 1 | 0 | 0 | 0 | 1 | 0 | 1 | 0 | 0 |
| 0 | 0 | 1 | 0 | 0 | 0 | 1 | 1 | 1 | 0 | 0 |
| 0 | 0 | 1 | 0 | 0 | 1 | 0 | 0 | 1 | 0 | 0 |
| 0 | 0 | 1 | 0 | 0 | 1 | 0 | 1 | 1 | 0 | 0 |
| 0 | 0 | 1 | 0 | 0 | 1 | 1 | 0 | 1 | 0 | 0 |
| 0 | 0 | 1 | 0 | 0 | 1 | 1 | 1 | 1 | 0 | 0 |
| 0 | 0 | 1 | 0 | 1 | 0 | 0 | 0 | 1 | 0 | 0 |
| 0 | 0 | 1 | 0 | 1 | 0 | 0 | 1 | 1 | 0 | 0 |
| 0 | 0 | 1 | 0 | 1 | 0 | 1 | 0 | 1 | 0 | 0 |
| 0 | 0 | 1 | 0 | 1 | 0 | 1 | 1 | 1 | 0 | 0 |
| 0 | 0 | 1 | 0 | 1 | 1 | 0 | 0 | 1 | 0 | 0 |
| 0 | 0 | 1 | 0 | 1 | 1 | 0 | 1 | 1 | 0 | 0 |
| 0 | 0 | 1 | 0 | 1 | 1 | 1 | 0 | 1 | 0 | 0 |
| 0 | 0 | 1 | 0 | 1 | 1 | 1 | 1 | 1 | 0 | 0 |
| 0 | 0 | 1 | 1 | 0 | 0 | 0 | 0 | 1 | 0 | 0 |
| 0 | 0 | 1 | 1 | 0 | 0 | 0 | 1 | 1 | 0 | 0 |
| 0 | 0 | 1 | 1 | 0 | 0 | 1 | 0 | 1 | 0 | 0 |
| 0 | 0 | 1 | 1 | 0 | 0 | 1 | 1 | 1 | 0 | 0 |
| 0 | 0 | 1 | 1 | 0 | 1 | 0 | 0 | 1 | 0 | 0 |
| 0 | 0 | 1 | 1 | 0 | 1 | 0 | 1 | 1 | 0 | 0 |
| 0 | 0 | 1 | 1 | 0 | 1 | 1 | 0 | 1 | 0 | 0 |
| 0 | 0 | 1 | 1 | 0 | 1 | 1 | 1 | 1 | 0 | 0 |
| 0 | 0 | 1 | 1 | 1 | 0 | 0 | 0 | 1 | 0 | 0 |
| 0 | 0 | 1 | 1 | 1 | 0 | 0 | 1 | 1 | 0 | 0 |
| 0 | 0 | 1 | 1 | 1 | 0 | 1 | 0 | 1 | 0 | 0 |
| 0 | 0 | 1 | 1 | 1 | 0 | 1 | 1 | 1 | 0 | 0 |
| 0 | 0 | 1 | 1 | 1 | 1 | 0 | 0 | 1 | 0 | 0 |
| 0 | 0 | 1 | 1 | 1 | 1 | 0 | 1 | 1 | 0 | 0 |
| 0 | 0 | 1 | 1 | 1 | 1 | 1 | 0 | 1 | 0 | 0 |
| 0 | 0 | 1 | 1 | 1 | 1 | 1 | 1 | 1 | 0 | 0 |

TABLE II
PROGRAM 2 FOR FIG. 4

| A7 | A6 | A5 | A4 | A3 | A2 | A1 | A0 | Q3 | Q2 | Q1 |
|---|---|---|---|---|---|---|---|---|---|---|
| 0 | 1 | 0 | 0 | 0 | 0 | 0 | 0 | 0 | 0 | 1 |
| 0 | 1 | 0 | 0 | 0 | 0 | 0 | 1 | 0 | 0 | 1 |
| 0 | 1 | 0 | 0 | 0 | 0 | 1 | 0 | 0 | 0 | 1 |
| 0 | 1 | 0 | 0 | 0 | 0 | 1 | 1 | 0 | 1 | 0 |
| 0 | 1 | 0 | 0 | 0 | 1 | 0 | 0 | 0 | 1 | 0 |
| 0 | 1 | 0 | 0 | 0 | 1 | 0 | 1 | 0 | 1 | 0 |
| 0 | 1 | 0 | 0 | 0 | 1 | 1 | 0 | 1 | 0 | 0 |
| 0 | 1 | 0 | 0 | 0 | 1 | 1 | 1 | 1 | 0 | 0 |
| 0 | 1 | 0 | 0 | 1 | 0 | 0 | 0 | 1 | 0 | 0 |
| 0 | 1 | 0 | 0 | 1 | 0 | 0 | 1 | 1 | 0 | 0 |
| 0 | 1 | 0 | 0 | 1 | 0 | 1 | 0 | 1 | 0 | 0 |
| 0 | 1 | 0 | 0 | 1 | 0 | 1 | 1 | 1 | 0 | 0 |
| 0 | 1 | 0 | 0 | 1 | 1 | 0 | 0 | 1 | 0 | 0 |
| 0 | 1 | 0 | 0 | 1 | 1 | 0 | 1 | 1 | 0 | 0 |
| 0 | 1 | 0 | 0 | 1 | 1 | 1 | 0 | 1 | 0 | 0 |
| 0 | 1 | 0 | 0 | 1 | 1 | 1 | 1 | 1 | 0 | 0 |
| 0 | 1 | 0 | 1 | 0 | 0 | 0 | 0 | 1 | 0 | 0 |
| 0 | 1 | 0 | 1 | 0 | 0 | 0 | 1 | 1 | 0 | 0 |
| 0 | 1 | 0 | 1 | 0 | 0 | 1 | 0 | 1 | 0 | 0 |
| 0 | 1 | 0 | 1 | 0 | 0 | 1 | 1 | 1 | 0 | 0 |
| 0 | 1 | 0 | 1 | 0 | 1 | 0 | 0 | 1 | 0 | 0 |
| 0 | 1 | 0 | 1 | 0 | 1 | 0 | 1 | 1 | 0 | 0 |
| 0 | 1 | 0 | 1 | 0 | 1 | 1 | 0 | 1 | 0 | 0 |
| 0 | 1 | 0 | 1 | 0 | 1 | 1 | 1 | 1 | 0 | 0 |
| 0 | 1 | 0 | 1 | 1 | 0 | 0 | 0 | 1 | 0 | 0 |
| 0 | 1 | 0 | 1 | 1 | 0 | 0 | 1 | 1 | 0 | 0 |
| 0 | 1 | 0 | 1 | 1 | 0 | 1 | 0 | 1 | 0 | 0 |
| 0 | 1 | 0 | 1 | 1 | 0 | 1 | 1 | 1 | 0 | 0 |
| 0 | 1 | 0 | 1 | 1 | 1 | 0 | 0 | 1 | 0 | 0 |
| 0 | 1 | 0 | 1 | 1 | 1 | 0 | 1 | 1 | 0 | 0 |
| 0 | 1 | 0 | 1 | 1 | 1 | 1 | 0 | 1 | 0 | 0 |
| 0 | 1 | 0 | 1 | 1 | 1 | 1 | 1 | 1 | 0 | 0 |
| 0 | 1 | 1 | 0 | 0 | 0 | 0 | 0 | 1 | 0 | 0 |
| 0 | 1 | 1 | 0 | 0 | 0 | 0 | 1 | 1 | 0 | 0 |
| 0 | 1 | 1 | 0 | 0 | 0 | 1 | 0 | 1 | 0 | 0 |
| 0 | 1 | 1 | 0 | 0 | 0 | 1 | 1 | 1 | 0 | 0 |
| 0 | 1 | 1 | 0 | 0 | 1 | 0 | 0 | 1 | 0 | 0 |
| 0 | 1 | 1 | 0 | 0 | 1 | 0 | 1 | 1 | 0 | 0 |
| 0 | 1 | 1 | 0 | 0 | 1 | 1 | 0 | 1 | 0 | 0 |
| 0 | 1 | 1 | 0 | 0 | 1 | 1 | 1 | 1 | 0 | 0 |
| 0 | 1 | 1 | 0 | 1 | 0 | 0 | 0 | 1 | 0 | 0 |
| 0 | 1 | 1 | 0 | 1 | 0 | 0 | 1 | 1 | 0 | 0 |
| 0 | 1 | 1 | 0 | 1 | 0 | 1 | 0 | 1 | 0 | 0 |
| 0 | 1 | 1 | 0 | 1 | 0 | 1 | 1 | 1 | 0 | 0 |
| 0 | 1 | 1 | 0 | 1 | 1 | 0 | 0 | 1 | 0 | 0 |
| 0 | 1 | 1 | 0 | 1 | 1 | 0 | 1 | 1 | 0 | 0 |
| 0 | 1 | 1 | 0 | 1 | 1 | 1 | 0 | 1 | 0 | 0 |
| 0 | 1 | 1 | 0 | 1 | 1 | 1 | 1 | 1 | 0 | 0 |
| 0 | 1 | 1 | 1 | 0 | 0 | 0 | 0 | 1 | 0 | 0 |
| 0 | 1 | 1 | 1 | 0 | 0 | 0 | 1 | 1 | 0 | 0 |
| 0 | 1 | 1 | 1 | 0 | 0 | 1 | 0 | 1 | 0 | 0 |
| 0 | 1 | 1 | 1 | 0 | 0 | 1 | 1 | 1 | 0 | 0 |
| 0 | 1 | 1 | 1 | 0 | 1 | 0 | 0 | 1 | 0 | 0 |
| 0 | 1 | 1 | 1 | 0 | 1 | 0 | 1 | 1 | 0 | 0 |
| 0 | 1 | 1 | 1 | 0 | 1 | 1 | 0 | 1 | 0 | 0 |
| 0 | 1 | 1 | 1 | 0 | 1 | 1 | 1 | 1 | 0 | 0 |
| 0 | 1 | 1 | 1 | 1 | 0 | 0 | 0 | 1 | 0 | 0 |
| 0 | 1 | 1 | 1 | 1 | 0 | 0 | 1 | 1 | 0 | 0 |
| 0 | 1 | 1 | 1 | 1 | 0 | 1 | 0 | 1 | 0 | 0 |
| 0 | 1 | 1 | 1 | 1 | 0 | 1 | 1 | 1 | 0 | 0 |
| 0 | 1 | 1 | 1 | 1 | 1 | 0 | 0 | 1 | 0 | 0 |
| 0 | 1 | 1 | 1 | 1 | 1 | 0 | 1 | 1 | 0 | 0 |
| 0 | 1 | 1 | 1 | 1 | 1 | 1 | 0 | 1 | 0 | 0 |
| 0 | 1 | 1 | 1 | 1 | 1 | 1 | 1 | 1 | 0 | 0 |

TABLE III
PROGRAM 3 FOR FIG. 5

| A7 | A6 | A5 | A4 | A3 | A2 | A1 | A0 | Q3 | Q2 | Q1 |
|---|---|---|---|---|---|---|---|---|---|---|
| 1 | 0 | 0 | 0 | 0 | 0 | 0 | 0 | 0 | 0 | 1 |
| 1 | 0 | 0 | 0 | 0 | 0 | 0 | 1 | 0 | 1 | 0 |
| 1 | 0 | 0 | 0 | 0 | 0 | 1 | 0 | 1 | 0 | 0 |
| 1 | 0 | 0 | 0 | 0 | 0 | 1 | 1 | 1 | 0 | 0 |
| 1 | 0 | 0 | 0 | 0 | 1 | 0 | 0 | 1 | 0 | 0 |
| 1 | 0 | 0 | 0 | 0 | 1 | 0 | 1 | 1 | 0 | 0 |
| 1 | 0 | 0 | 0 | 0 | 1 | 1 | 0 | 1 | 0 | 0 |
| 1 | 0 | 0 | 0 | 0 | 1 | 1 | 1 | 1 | 0 | 0 |
| 1 | 0 | 0 | 0 | 1 | 0 | 0 | 0 | 1 | 0 | 0 |
| 1 | 0 | 0 | 0 | 1 | 0 | 0 | 1 | 1 | 0 | 0 |
| 1 | 0 | 0 | 0 | 1 | 0 | 1 | 0 | 1 | 0 | 0 |
| 1 | 0 | 0 | 0 | 1 | 0 | 1 | 1 | 1 | 0 | 0 |
| 1 | 0 | 0 | 0 | 1 | 1 | 0 | 0 | 1 | 0 | 0 |
| 1 | 0 | 0 | 0 | 1 | 1 | 0 | 1 | 1 | 0 | 0 |
| 1 | 0 | 0 | 0 | 1 | 1 | 1 | 0 | 1 | 0 | 0 |
| 1 | 0 | 0 | 0 | 1 | 1 | 1 | 1 | 1 | 0 | 0 |
| 1 | 0 | 0 | 1 | 0 | 0 | 0 | 0 | 1 | 0 | 0 |
| 1 | 0 | 0 | 1 | 0 | 0 | 0 | 1 | 1 | 0 | 0 |
| 1 | 0 | 0 | 1 | 0 | 0 | 1 | 0 | 1 | 0 | 0 |
| 1 | 0 | 0 | 1 | 0 | 0 | 1 | 1 | 1 | 0 | 0 |
| 1 | 0 | 0 | 1 | 0 | 1 | 0 | 0 | 1 | 0 | 0 |
| 1 | 0 | 0 | 1 | 0 | 1 | 0 | 1 | 1 | 0 | 0 |
| 1 | 0 | 0 | 1 | 0 | 1 | 1 | 0 | 1 | 0 | 0 |
| 1 | 0 | 0 | 1 | 0 | 1 | 1 | 1 | 1 | 0 | 0 |
| 1 | 0 | 0 | 1 | 1 | 0 | 0 | 0 | 1 | 0 | 0 |
| 1 | 0 | 0 | 1 | 1 | 0 | 0 | 1 | 1 | 0 | 0 |
| 1 | 0 | 0 | 1 | 1 | 0 | 1 | 0 | 1 | 0 | 0 |
| 1 | 0 | 0 | 1 | 1 | 0 | 1 | 1 | 1 | 0 | 0 |
| 1 | 0 | 0 | 1 | 1 | 1 | 0 | 0 | 1 | 0 | 0 |
| 1 | 0 | 0 | 1 | 1 | 1 | 0 | 1 | 1 | 0 | 0 |
| 1 | 0 | 0 | 1 | 1 | 1 | 1 | 0 | 1 | 0 | 0 |
| 1 | 0 | 0 | 1 | 1 | 1 | 1 | 1 | 1 | 0 | 0 |
| 1 | 0 | 1 | 0 | 0 | 0 | 0 | 0 | 1 | 0 | 0 |
| 1 | 0 | 1 | 0 | 0 | 0 | 0 | 1 | 1 | 0 | 0 |
| 1 | 0 | 1 | 0 | 0 | 0 | 1 | 0 | 1 | 0 | 0 |

Figure 5:
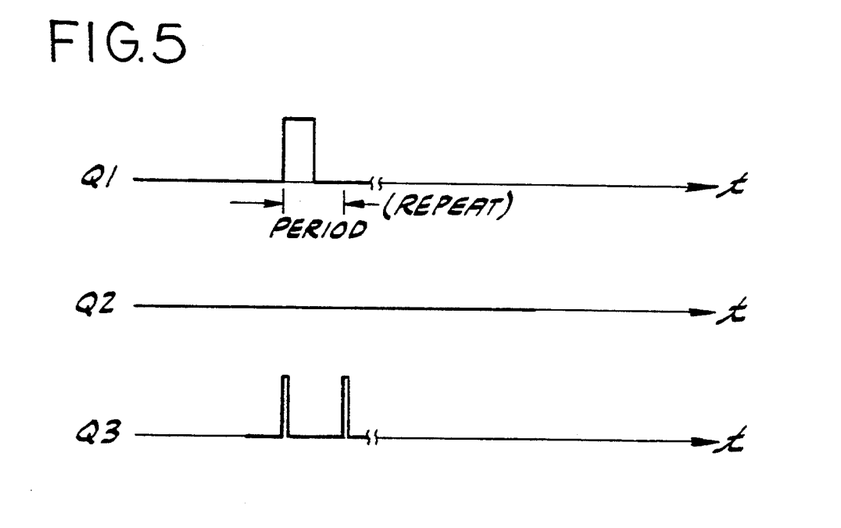

TABLE III-continued
PROGRAM 3 FOR FIG. 5

| ROM Address Inputs | | | | | | | | ROM Outputs | | |
|---|---|---|---|---|---|---|---|---|---|---|
| $A_7$ | $A_6$ | $A_5$ | $A_4$ | $A_3$ | $A_2$ | $A_1$ | $A_0$ | $Q_3$ | $Q_2$ | $Q_1$ |
| 1 | 0 | 1 | 0 | 1 | 0 | 0 | 1 | 1 | 0 | 0 |
| 1 | 0 | 1 | 0 | 1 | 0 | 1 | 0 | 1 | 0 | 0 |
| 1 | 0 | 1 | 0 | 1 | 0 | 1 | 1 | 1 | 0 | 0 |
| 1 | 0 | 1 | 0 | 1 | 1 | 0 | 0 | 1 | 0 | 0 |
| 1 | 0 | 1 | 0 | 1 | 1 | 0 | 1 | 1 | 0 | 0 |
| 1 | 0 | 1 | 0 | 1 | 1 | 1 | 0 | 1 | 0 | 0 |
| 1 | 0 | 1 | 0 | 1 | 1 | 1 | 1 | 1 | 0 | 0 |
| 1 | 0 | 1 | 1 | 0 | 0 | 0 | 0 | 1 | 0 | 0 |
| 1 | 0 | 1 | 1 | 0 | 0 | 0 | 1 | 1 | 0 | 0 |
| 1 | 0 | 1 | 1 | 0 | 0 | 1 | 0 | 1 | 0 | 0 |
| 1 | 0 | 1 | 1 | 0 | 0 | 1 | 1 | 1 | 0 | 0 |
| 1 | 0 | 1 | 1 | 0 | 1 | 0 | 0 | 1 | 0 | 0 |
| 1 | 0 | 1 | 1 | 0 | 1 | 0 | 1 | 1 | 0 | 0 |
| 1 | 0 | 1 | 1 | 0 | 1 | 1 | 0 | 1 | 0 | 0 |
| 1 | 0 | 1 | 1 | 0 | 1 | 1 | 1 | 1 | 0 | 0 |
| 1 | 0 | 1 | 1 | 1 | 0 | 0 | 0 | 1 | 0 | 0 |
| 1 | 0 | 1 | 1 | 1 | 0 | 0 | 1 | 1 | 0 | 0 |
| 1 | 0 | 1 | 1 | 1 | 0 | 1 | 0 | 1 | 0 | 0 |
| 1 | 0 | 1 | 1 | 1 | 0 | 1 | 1 | 1 | 0 | 0 |
| 1 | 0 | 1 | 1 | 1 | 1 | 0 | 0 | 1 | 0 | 0 |
| 1 | 0 | 1 | 1 | 1 | 1 | 0 | 1 | 1 | 0 | 0 |
| 1 | 0 | 1 | 1 | 1 | 1 | 1 | 0 | 1 | 0 | 0 |
| 1 | 0 | 1 | 1 | 1 | 1 | 1 | 1 | 1 | 0 | 0 |

TABLE IV
PROGRAM 4 FOR FIG. 6

| ROM Address Inputs | | | | | | | | ROM Outputs | | |
|---|---|---|---|---|---|---|---|---|---|---|
| $A_7$ | $A_6$ | $A_5$ | $A_4$ | $A_3$ | $A_2$ | $A_1$ | $A_0$ | $Q_3$ | $Q_2$ | $Q_1$ |
| 1 | 1 | 0 | 0 | 0 | 0 | 0 | 0 | 0 | 0 | 1 |
| 1 | 1 | 0 | 0 | 0 | 0 | 0 | 1 | 0 | 0 | 0 |
| 1 | 1 | 0 | 0 | 0 | 0 | 1 | 0 | 0 | 1 | 0 |
| 1 | 1 | 0 | 0 | 0 | 0 | 1 | 1 | 0 | 0 | 0 |
| 1 | 1 | 0 | 0 | 0 | 1 | 0 | 0 | 0 | 0 | 1 |
| 1 | 1 | 0 | 0 | 0 | 1 | 0 | 1 | 0 | 0 | 0 |
| 1 | 1 | 0 | 0 | 0 | 1 | 1 | 0 | 0 | 0 | 1 |
| 1 | 1 | 0 | 0 | 0 | 1 | 1 | 1 | 0 | 0 | 0 |
| 1 | 1 | 0 | 0 | 1 | 0 | 0 | 0 | 0 | 1 | 0 |
| 1 | 1 | 0 | 0 | 1 | 0 | 0 | 1 | 0 | 0 | 0 |
| 1 | 1 | 0 | 0 | 1 | 0 | 1 | 0 | 0 | 1 | 0 |
| 1 | 1 | 0 | 0 | 1 | 0 | 1 | 1 | 0 | 0 | 0 |
| 1 | 1 | 0 | 0 | 1 | 1 | 0 | 0 | 0 | 0 | 1 |
| 1 | 1 | 0 | 0 | 1 | 1 | 0 | 1 | 0 | 0 | 0 |
| 1 | 1 | 0 | 0 | 1 | 1 | 1 | 0 | 0 | 0 | 1 |
| 1 | 1 | 0 | 0 | 1 | 1 | 1 | 1 | 0 | 0 | 0 |
| 1 | 1 | 0 | 1 | 0 | 0 | 0 | 0 | 0 | 0 | 1 |
| 1 | 1 | 0 | 1 | 0 | 0 | 0 | 1 | 0 | 0 | 0 |
| 1 | 1 | 0 | 1 | 0 | 0 | 1 | 0 | 0 | 1 | 0 |
| 1 | 1 | 0 | 1 | 0 | 0 | 1 | 1 | 0 | 0 | 0 |
| 1 | 1 | 0 | 1 | 0 | 1 | 0 | 0 | 0 | 1 | 0 |
| 1 | 1 | 0 | 1 | 0 | 1 | 1 | 0 | 0 | 1 | 0 |
| 1 | 1 | 0 | 1 | 0 | 1 | 1 | 1 | 0 | 0 | 0 |
| 1 | 1 | 0 | 1 | 1 | 0 | 0 | 0 | 0 | 1 | 1 |
| 1 | 1 | 0 | 1 | 1 | 0 | 0 | 1 | 0 | 1 | 1 |
| 1 | 1 | 0 | 1 | 1 | 0 | 1 | 0 | 0 | 1 | 1 |
| 1 | 1 | 0 | 1 | 1 | 0 | 1 | 1 | 0 | 0 | 0 |
| 1 | 1 | 0 | 1 | 1 | 1 | 0 | 0 | 0 | 0 | 0 |
| 1 | 1 | 0 | 1 | 1 | 1 | 0 | 1 | 0 | 0 | 0 |
| 1 | 1 | 0 | 1 | 1 | 1 | 1 | 0 | 0 | 1 | 1 |
| 1 | 1 | 0 | 1 | 1 | 1 | 1 | 1 | 0 | 1 | 1 |
| 1 | 1 | 1 | 0 | 0 | 0 | 0 | 0 | 0 | 1 | 1 |
| 1 | 1 | 1 | 0 | 0 | 0 | 0 | 1 | 1 | 0 | 0 |
| 1 | 1 | 1 | 0 | 0 | 0 | 1 | 0 | 1 | 0 | 0 |
| 1 | 1 | 1 | 0 | 0 | 0 | 1 | 1 | 1 | 0 | 0 |
| 1 | 1 | 1 | 0 | 0 | 1 | 0 | 0 | 1 | 0 | 0 |
| 1 | 1 | 1 | 0 | 0 | 1 | 0 | 1 | 1 | 0 | 0 |
| 1 | 1 | 1 | 0 | 0 | 1 | 1 | 0 | 1 | 0 | 0 |
| 1 | 1 | 1 | 0 | 0 | 1 | 1 | 1 | 1 | 0 | 0 |
| 1 | 1 | 1 | 0 | 1 | 0 | 0 | 0 | 1 | 0 | 0 |
| 1 | 1 | 1 | 0 | 1 | 0 | 0 | 1 | 1 | 0 | 0 |
| 1 | 1 | 1 | 0 | 1 | 0 | 1 | 0 | 1 | 0 | 0 |
| 1 | 1 | 1 | 0 | 1 | 1 | 0 | 0 | 1 | 0 | 0 |
| 1 | 1 | 1 | 0 | 1 | 1 | 0 | 1 | 1 | 0 | 0 |
| 1 | 1 | 1 | 0 | 1 | 1 | 1 | 0 | 1 | 0 | 0 |

Figure 6:
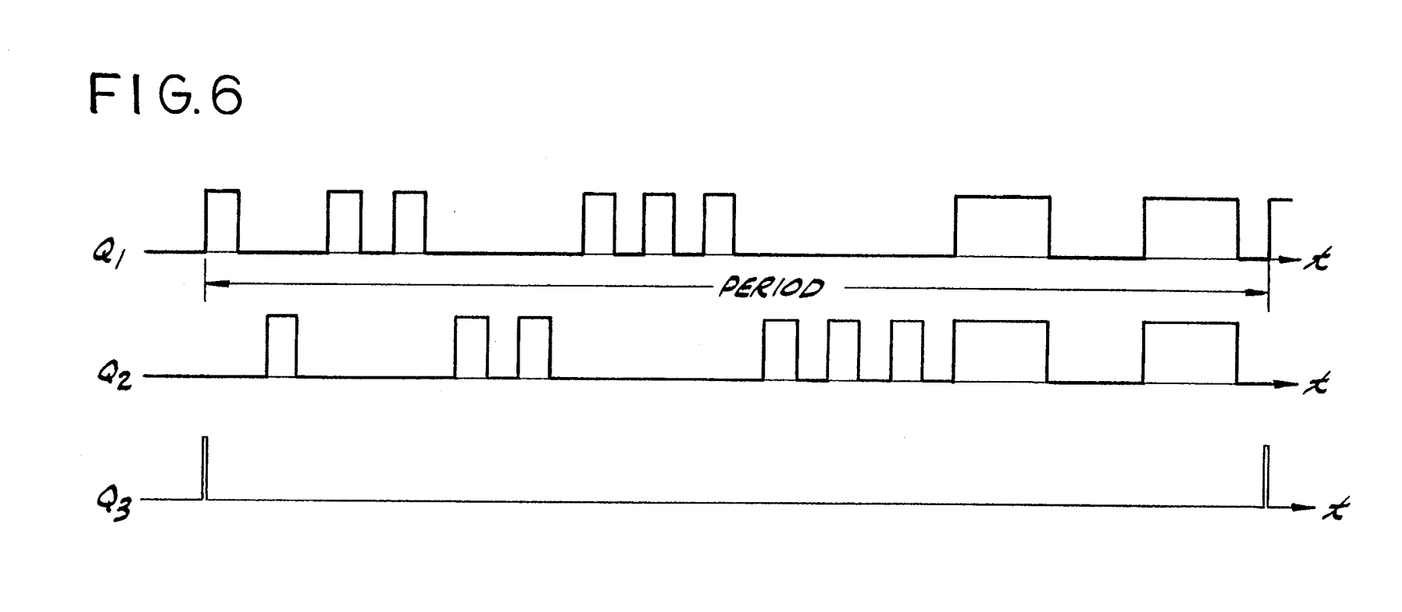

TABLE IV-continued
PROGRAM 4 FOR FIG. 6

| ROM Address Inputs | | | | | | | | ROM Outputs | | |
|---|---|---|---|---|---|---|---|---|---|---|
| $A_7$ | $A_6$ | $A_5$ | $A_4$ | $A_3$ | $A_2$ | $A_1$ | $A_0$ | $Q_3$ | $Q_2$ | $Q_1$ |
| 1 | 1 | 1 | 1 | 0 | 0 | 0 | 0 | 1 | 0 | 0 |
| 1 | 1 | 1 | 1 | 0 | 0 | 0 | 1 | 1 | 0 | 0 |
| 1 | 1 | 1 | 1 | 0 | 0 | 1 | 0 | 1 | 0 | 0 |
| 1 | 1 | 1 | 1 | 0 | 0 | 1 | 1 | 1 | 0 | 0 |
| 1 | 1 | 1 | 1 | 0 | 1 | 0 | 0 | 1 | 0 | 0 |
| 1 | 1 | 1 | 1 | 0 | 1 | 0 | 1 | 1 | 0 | 0 |
| 1 | 1 | 1 | 1 | 0 | 1 | 1 | 0 | 1 | 0 | 0 |
| 1 | 1 | 1 | 1 | 0 | 1 | 1 | 1 | 1 | 0 | 0 |
| 1 | 1 | 1 | 1 | 1 | 0 | 0 | 0 | 1 | 0 | 0 |
| 1 | 1 | 1 | 1 | 1 | 0 | 0 | 1 | 1 | 0 | 0 |
| 1 | 1 | 1 | 1 | 1 | 0 | 1 | 0 | 1 | 0 | 0 |
| 1 | 1 | 1 | 1 | 1 | 0 | 1 | 1 | 1 | 0 | 0 |
| 1 | 1 | 1 | 1 | 1 | 1 | 0 | 0 | 1 | 0 | 0 |
| 1 | 1 | 1 | 1 | 1 | 1 | 0 | 1 | 1 | 0 | 0 |
| 1 | 1 | 1 | 1 | 1 | 1 | 1 | 0 | 1 | 0 | 0 |
| 1 | 1 | 1 | 1 | 1 | 1 | 1 | 1 | 1 | 0 | 0 |

Examples of actual output voltage of control circuit 11 over time are shown as the digital cycles in FIGS. 3-6 corresponding to programs 1-4 of Tables I-IV respectively. It should be noted that the reset bit occurs as a brief pulse of voltage at the Q3 output of memory 121, although numerous bits marked Q3 in the Tables are provided for addresses outside a given pattern in a selected block of address space. These other Q3 bits assure resetting in presence of electrical noise on the address lines.

In FIG. 3, tile program Of Table I causes lamp 51 to make two short flashes, then causes lamp 53 to make two short flashes and then make lamps 51 and 53 both make two long flashes in synchronism, whence the cycle is repeated. Each digital cycle as illustrated by the waveform of Q1 in FIG. 3 has at least two pulses that differ in duration (longer and shorter) and at least two spaces that differ in duration.

The digital cycle of Q1 can also be described as including a sequence of pulses having at least two differing subperiods and every subperiod exceeds one-tenth second. Values of subperiod are for the present purposes defined as the time intervals (e.g., A, B, C, D) between each rising transition and the next rising transition and further values of subperiod are the time intervals (e.g., E, F, G, H) between each falling transition and the next falling transition. The duration (or on-period) of a pulse is regarded as the time interval between a rising transition initiating the pulse and the next falling transition. The duration (or off-period) of a space is regarded as the time interval between a falling transition initiating the space and the next rising transition. The duration of each pulse and of each space preferably also exceeds one-tenth of a second for easy recognition by personnel and the public, and for compatibility with the thermal time constant of many incandescent lamps.

Figure 7:
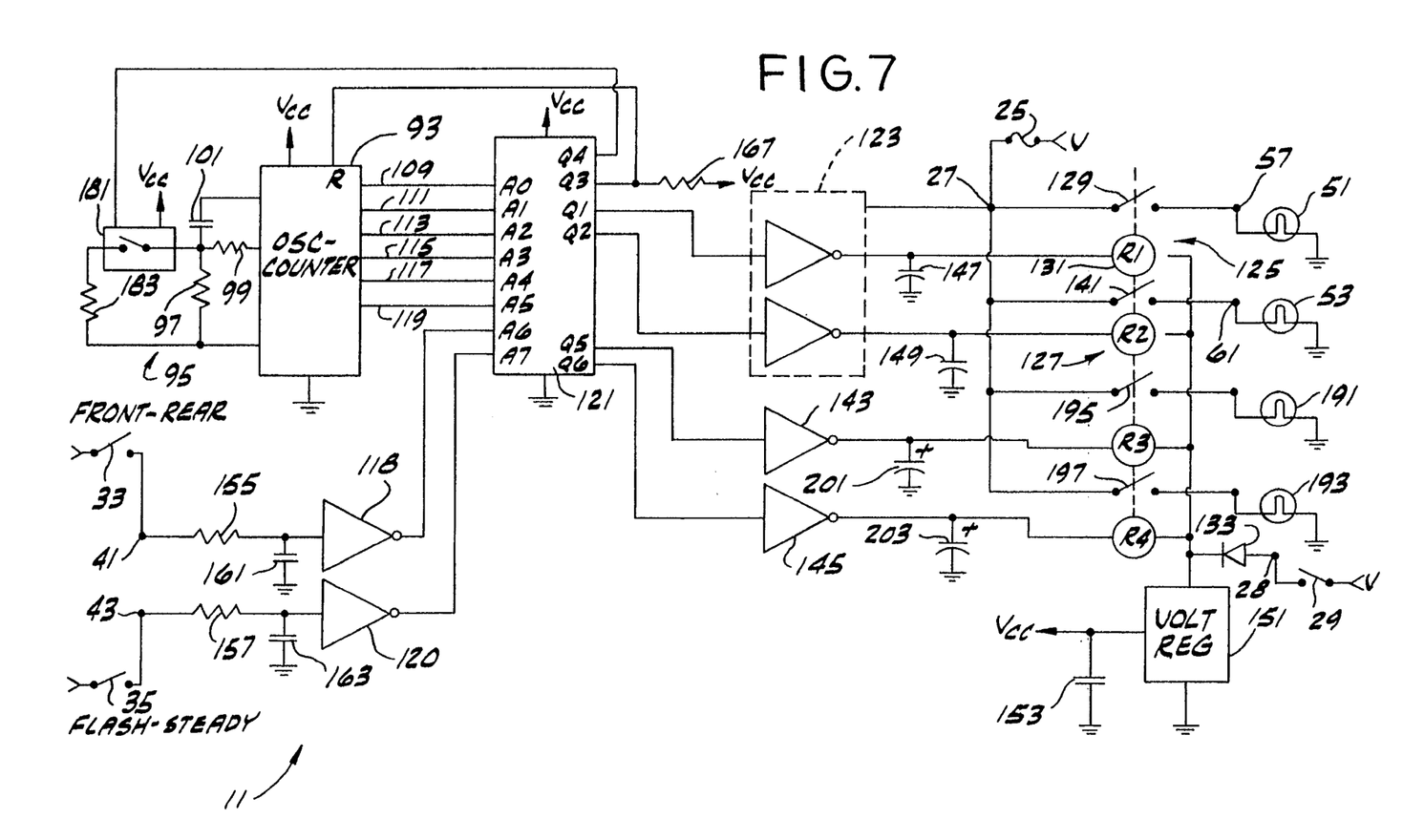
FIG. 7 is a more detailed electrical schematic diagram of another embodiment of inventive apparatus of FIG. 1.

A period is regarded as the interval of time required for a digital cycle to be produced and begin to repeat itself. Unity divided by the period is equal to frequency in cycles per second. In the embodiment of FIGS. 2 and 7 the period is the interval of time between one counter reset and the next such reset.

Additionally, memory 121 as represented by program 1, column Q1, can be described as including first sets of stored logic states interspersed with complementary stored logic states wherein the number of states in at least one of the first sets differs from the number of states in another one of the first sets. For example, in program 1, column Q1 has first sets $S_i$ of addresses (in decimal) holding logic ones as follows: $S_1=\{0\}$, $S_2=\{2\}$, $S_3=\{8, 9, 10\}$, $S_4=\{14, 15, 16\}$. Both sets $S_1$ and $S_2$ have only one address element while sets $S_3$ and $S_4$ each have 3 address elements.

Also as shown in FIG. 3, the voltage waveform of output Q2 represents a digital cycle having a sequence of pulses and spaces. If Q2 is a logical "1" this represents a pulse, and lamp 53 will be illuminated. Whenever Q2 is a logical "0" this represents a space, and lamp 53 will be extinguished. With the provision of output Q2 of memory 121, the apparatus is capable of producing different first and second concurrent digital cycles which concurrently apply electrical energization from the electrical source to the two signal devices in accordance with the pulses of the concurrent digital cycles.

Figure 4:
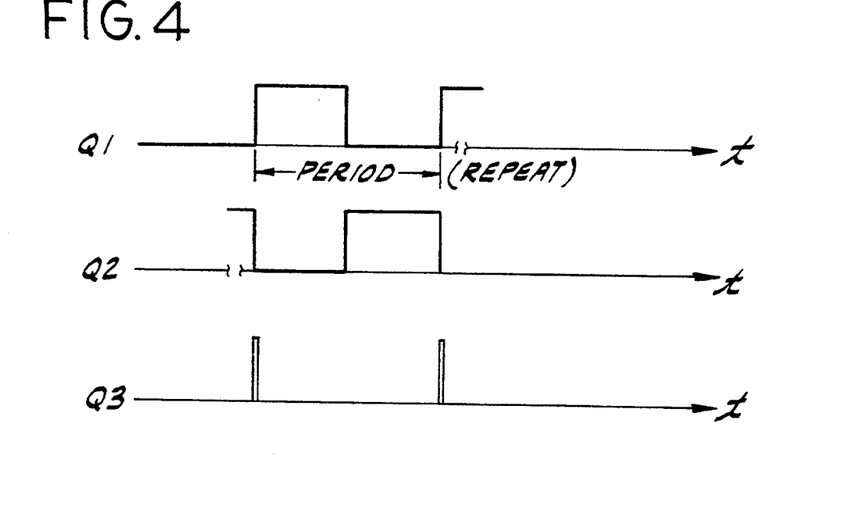

Program 2 for FIG. 4 causes alternate flashing of lamps 51 and 53. Program 3 for FIG. 5 makes lamp 51 flash faster and with shorter flash duration than FIG. 4, while lamp 53 is unused. Program 4 for FIG. 6 makes lamps 51 and 53 alternately produce a single flash, then a double flash, and then a triple flash. Then both lamps produce a double long flash in synchronism, whence the cycle repeats. It should be apparent ill view of tile above examples that the memory is programmable for innumerable flash patterns due to the extreme versatility of tile invention.

Another embodiment of the present invention is shown in FIG. 7. Compared to FIG. 2, memory device 121 includes an additional output Q4 for selectively altering tile repetition rate of the oscillator at least once as each digital cycle is produced. The stored bits in each program at the Q4 position are counter rate control bits. Output Q4 is connected to an electronic switch 181 which is connected in series with a resistor 183. The series combination of electronic switch 181 and resistor 183 is connected in parallel with resistor 97. When output Q4 is a logic "1" indicating that tile operating frequency of the oscillator is to be altered, electronic switch 181 closes to reduce and thus alter the time constant of RC network 95. In this way memory 121 concurrently generates the rate control signal as the digital cycle is produced.

Two additional signal lamps 191 and 193 are connected to contacts 195 and 197 of two additional relays R3 and R4. All of the contacts 129, 141, 195 and 197 are connected in common to source voltage at terminal 27. Relays R3 and R4 are actuated by inverters 143 and 145 which have their inputs connected to two further memory outputs Q5 and Q6 respectively. Capacitors 201 and 203 respectively protect the outputs of inverters 143 and 145 from switching transients.

Figure 8:
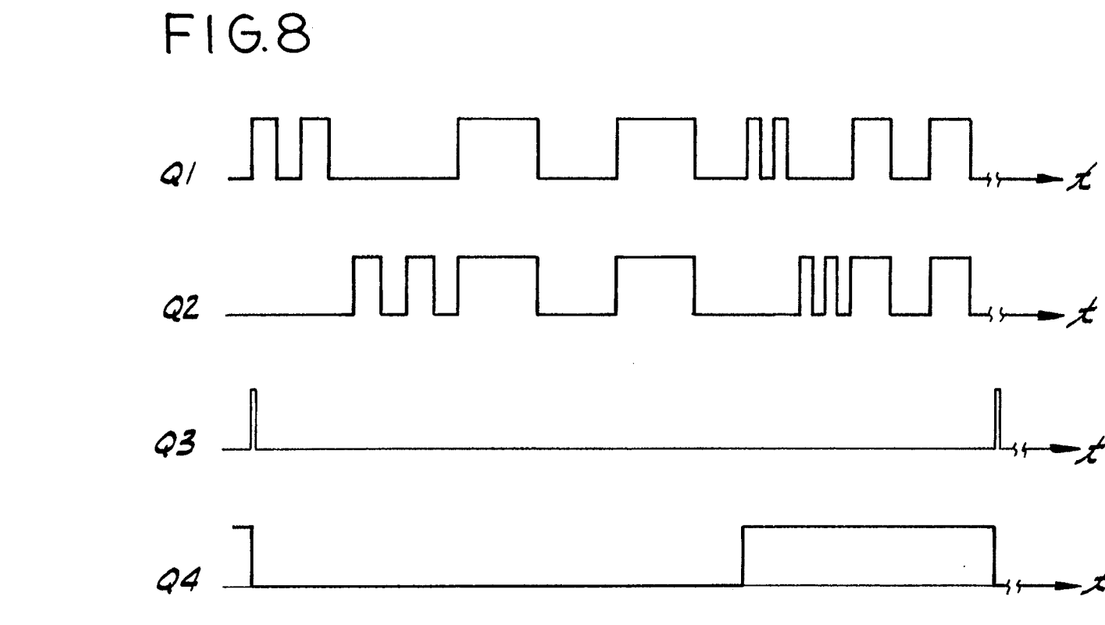
FIG. 8 is a voltage waveform diagram of an energization pattern stored in and produced from a memory in the inventive apparatus of FIG. 7 according to inventive methods.

Table V represents the values stored at each memory location in memory device 121 of FIG. 7 for a Program 5, which is one of four programs. The programs are designated Programs 5, 6, 7, 8 and are selectable by switches 33 and 35. FIG. 8 represents the voltage waveform of the outputs Q1, Q2, Q3, and Q4 of memory device 121 for program 5. For Program 5 switch 33 is set to FRONT and switch 35 is set to FLASH. The waveform of FIG. 8 makes lamp 51 emit two short flashes followed by two short flashes from lamp 53, and then makes both lamps emit two long flashes in synchronism. This action is then repeated (with Q4 high) at twice-speed whence the digital cycle is completed and a short reset Q3 pulse begins the digital cycle anew. Lamps 51 and 53 are regarded as front lamps, and lamps 191 and 193 are regarded as rear lamps for purposes of this example. The Q5 and Q6 outputs are all logic ones so that the rear lamps 191 and 193 are on in program 5.

When switch 33 is set to REAR and switch 35 remains on FLASH, a Program 6 is selected in memory 121. Program 6 resembles Program 5 except that Q6 and Q5 of Program 6 programmed to flash the same way as Q2 and Q1 in Program 5. In Program 6 Q1 and Q2 are all logic ones. In this way the front lamps provide steady illumination while the rear lamps flash. In Programs 7 and 8 (switch 35 on STEADY) Q1, Q2, Q5 and Q6 are all logic ones so that all lamps provide steady illumination. In this way the multimode switches provide selection of signal devices in different locations as well as selection of a particular signal device over time.

TABLE V

PROGRAM 5 FOR FIG. 7

| ROM Address Inputs | | | | | | | | ROM Outputs (Q6=Q5=1) | | | |
|---|---|---|---|---|---|---|---|---|---|---|---|
| $A_7$ | $A_6$ | $A_5$ | $A_4$ | $A_3$ | $A_2$ | $A_1$ | $A_0$ | $Q_4$ | $Q_3$ | $Q_2$ | $Q_1$ |
| 0 | 0 | 0 | 0 | 0 | 0 | 0 | 0 | 0 | 0 | 0 | 1 |
| 0 | 0 | 0 | 0 | 0 | 0 | 0 | 1 | 0 | 0 | 0 | 0 |
| 0 | 0 | 0 | 0 | 0 | 0 | 1 | 0 | 0 | 0 | 0 | 1 |
| 0 | 0 | 0 | 0 | 0 | 0 | 1 | 1 | 0 | 0 | 0 | 0 |
| 0 | 0 | 0 | 0 | 0 | 1 | 0 | 0 | 0 | 0 | 1 | 0 |
| 0 | 0 | 0 | 0 | 0 | 1 | 0 | 1 | 0 | 0 | 0 | 0 |
| 0 | 0 | 0 | 0 | 0 | 1 | 1 | 0 | 0 | 0 | 1 | 0 |
| 0 | 0 | 0 | 0 | 0 | 1 | 1 | 1 | 0 | 0 | 0 | 0 |
| 0 | 0 | 0 | 0 | 1 | 0 | 0 | 0 | 0 | 0 | 1 | 1 |
| 0 | 0 | 0 | 0 | 1 | 0 | 0 | 1 | 0 | 0 | 1 | 1 |
| 0 | 0 | 0 | 0 | 1 | 0 | 1 | 0 | 0 | 0 | 1 | 1 |
| 0 | 0 | 0 | 0 | 1 | 0 | 1 | 1 | 0 | 0 | 0 | 0 |
| 0 | 0 | 0 | 0 | 1 | 1 | 0 | 0 | 0 | 0 | 0 | 0 |
| 0 | 0 | 0 | 0 | 1 | 1 | 0 | 1 | 0 | 0 | 0 | 0 |
| 0 | 0 | 0 | 0 | 1 | 1 | 1 | 0 | 0 | 0 | 1 | 1 |
| 0 | 0 | 0 | 0 | 1 | 1 | 1 | 1 | 0 | 0 | 1 | 1 |
| 0 | 0 | 0 | 1 | 0 | 0 | 0 | 0 | 0 | 0 | 1 | 1 |
| 0 | 0 | 0 | 1 | 0 | 0 | 0 | 1 | 0 | 0 | 0 | 0 |
| 0 | 0 | 0 | 1 | 0 | 0 | 1 | 0 | 0 | 0 | 0 | 0 |
| 0 | 0 | 0 | 1 | 0 | 0 | 1 | 1 | 1 | 0 | 0 | 1 |
| 0 | 0 | 0 | 1 | 0 | 1 | 0 | 0 | 1 | 0 | 0 | 0 |
| 0 | 0 | 0 | 1 | 0 | 1 | 0 | 1 | 1 | 0 | 0 | 1 |
| 0 | 0 | 0 | 1 | 0 | 1 | 1 | 0 | 1 | 0 | 0 | 0 |
| 0 | 0 | 0 | 1 | 0 | 1 | 1 | 1 | 1 | 0 | 1 | 0 |
| 0 | 0 | 0 | 1 | 1 | 0 | 0 | 0 | 1 | 0 | 0 | 0 |
| 0 | 0 | 0 | 1 | 1 | 0 | 0 | 1 | 1 | 0 | 1 | 0 |
| 0 | 0 | 0 | 1 | 1 | 0 | 1 | 0 | 1 | 0 | 0 | 0 |
| 0 | 0 | 0 | 1 | 1 | 0 | 1 | 1 | 1 | 0 | 1 | 1 |
| 0 | 0 | 0 | 1 | 1 | 1 | 0 | 0 | 1 | 0 | 1 | 1 |
| 0 | 0 | 0 | 1 | 1 | 1 | 0 | 1 | 1 | 0 | 1 | 1 |
| 0 | 0 | 0 | 1 | 1 | 1 | 1 | 0 | 1 | 0 | 0 | 0 |
| 0 | 0 | 0 | 1 | 1 | 1 | 1 | 1 | 1 | 0 | 0 | 0 |
| 0 | 0 | 1 | 0 | 0 | 0 | 0 | 0 | 1 | 0 | 0 | 0 |
| 0 | 0 | 1 | 0 | 0 | 0 | 0 | 1 | 1 | 0 | 1 | 1 |
| 0 | 0 | 1 | 0 | 0 | 0 | 1 | 0 | 1 | 0 | 1 | 1 |
| 0 | 0 | 1 | 0 | 0 | 0 | 1 | 1 | 1 | 0 | 1 | 1 |
| 0 | 0 | 1 | 0 | 0 | 1 | 0 | 0 | 1 | 0 | 0 | 0 |
| 0 | 0 | 1 | 0 | 0 | 1 | 0 | 1 | 1 | 0 | 0 | 0 |
| 0 | 0 | 1 | 0 | 0 | 1 | 1 | 0 | 0 | 1 | 0 | 0 |
| 0 | 0 | 1 | 0 | 0 | 1 | 1 | 1 | 0 | 1 | 0 | 0 |
| 0 | 0 | 1 | 0 | 1 | 0 | 0 | 0 | 0 | 1 | 0 | 0 |
| 0 | 0 | 1 | 0 | 1 | 0 | 0 | 1 | 0 | 1 | 0 | 0 |
| 0 | 0 | 1 | 0 | 1 | 0 | 1 | 0 | 0 | 1 | 0 | 0 |
| 0 | 0 | 1 | 0 | 1 | 0 | 1 | 1 | 0 | 1 | 0 | 0 |
| 0 | 0 | 1 | 0 | 1 | 1 | 0 | 0 | 0 | 1 | 0 | 0 |
| 0 | 0 | 1 | 0 | 1 | 1 | 0 | 1 | 0 | 1 | 0 | 0 |
| 0 | 0 | 1 | 0 | 1 | 1 | 1 | 0 | 0 | 1 | 0 | 0 |
| 0 | 0 | 1 | 0 | 1 | 1 | 1 | 1 | 0 | 1 | 0 | 0 |
| 0 | 0 | 1 | 1 | 0 | 0 | 0 | 0 | 0 | 1 | 0 | 0 |
| 0 | 0 | 1 | 1 | 0 | 0 | 0 | 1 | 0 | 1 | 0 | 0 |
| 0 | 0 | 1 | 1 | 0 | 0 | 1 | 0 | 0 | 1 | 0 | 0 |

TABLE V-continued

PROGRAM 5 FOR FIG. 7

| ROM Address Inputs | | | | | | | | ROM Outputs (Q6=Q5=1) | | | |
|---|---|---|---|---|---|---|---|---|---|---|---|
| $A_7$ | $A_6$ | $A_5$ | $A_4$ | $A_3$ | $A_2$ | $A_1$ | $A_0$ | $Q_4$ | $Q_3$ | $Q_2$ | $Q_1$ |
| 0 | 0 | 1 | 1 | 1 | 0 | 1 | 0 | 0 | 1 | 0 | 0 |
| 0 | 0 | 1 | 1 | 1 | 0 | 1 | 1 | 0 | 1 | 0 | 0 |
| 0 | 0 | 1 | 1 | 1 | 1 | 0 | 0 | 0 | 1 | 0 | 0 |
| 0 | 0 | 1 | 1 | 1 | 1 | 0 | 1 | 0 | 1 | 0 | 0 |
| 0 | 0 | 1 | 1 | 1 | 1 | 1 | 0 | 0 | 1 | 0 | 0 |
| 0 | 0 | 1 | 1 | 1 | 1 | 1 | 1 | 0 | 1 | 0 | 0 |

Figure 9:
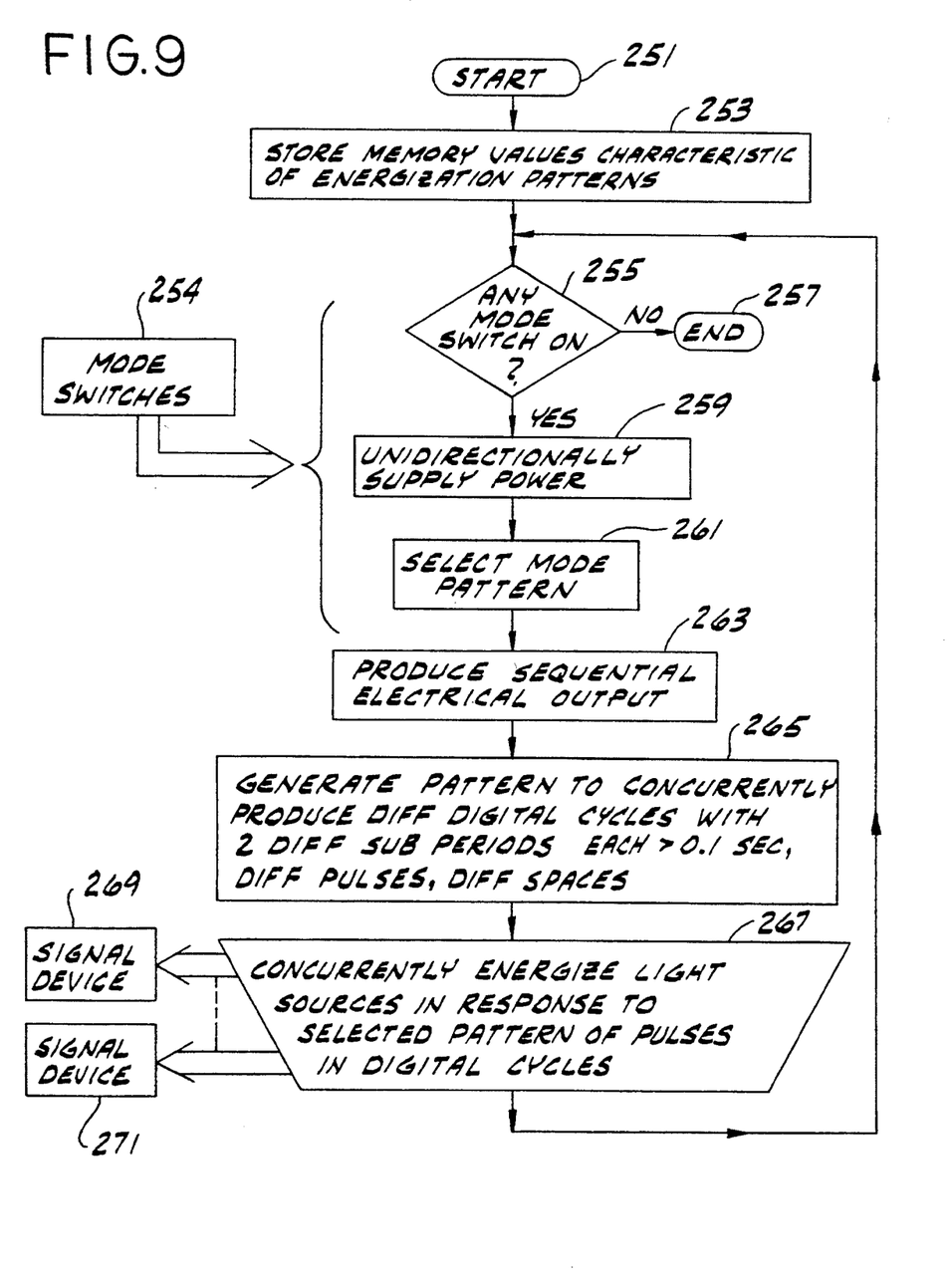
FIG. 9 is a flow diagram of inventive method steps of operating the inventive apparatus of FIGS. 2 and 7.

FIG. 9 illustrates a flow chart of a preferred method of the invention for controlling signal devices. Operations commence with a START 251. A step 253 stores in a memory a plurality of digital values characteristic of a plurality of different energization patterns such as light patterns. Each energization pattern indicates a predetermined energization condition of a signal device. Mode switches designated collectively by box 254 are operated to select one of the stored patterns.

A test step 255 determines if any mode switch is on. If not, operations terminate at an END 257. If one or more of the mode switches are on, operations proceed to a step 259 to unidirectionally supply power for operation of the control circuitry. Then in a step 261 the particular mode pattern is selected in accordance with the settings of the mode switches. A succeeding step 263 produces a sequential electrical output and then a step 265 responds to the sequential electrical output to generate the pattern to concurrently produce different first and second digital cycles wherein each digital cycle includes a sequence of pulses and spaces. In various aspects, at least two of the pulses differ in duration, at least two of the spaces differ in duration, and at least one of the digital cycles has two different subperiods! ; each exceeding a tenth of a second.

After step 265 a step 267 concurrently applies electrical energization to signal devices 269 and 271 in accordance with the pulses of the concurrent digital cycles respectively. Each signal device is thus energized in response to a selected pattern of pulses in digital cycles. Operations thereupon loop back to step 255 to continually execute the method. It is emphasized that the method is equally applicable in apparatus of the invention implemented entirely in hardware, in a microprocessor based control programmed with software, or in firmware implementations.

Further applications of the invention are contemplated ill stationary warning signs for highways, in industry and on boats and ships. Message boards are also suitably automated with the invention. A highway sign with several lamps arranged in tile form of an arrow has lamps controlled by relays actuated by multiple outputs of the preprogrammed control circuit to inexpensively provide an illusion of directional motion as the light output marches across the display. Multiple modes of operation are readily selected. Warning lamps for chemical spills and radiation leaks are also readily provided according to the principles of the invention. Consequently, the invention comprehends numerous embodiments which are providable for applications arising now and in the future, so that the utility of the invention can be fully realized.

In view of tile above, it will be seen that the several objects of the invention are achieved and other advantageous results attained.

As various changes could be made in the above constructions without departing form the scope of the invention, it is intended that all matter contained in the above description or shown in the accompanying drawings shall be interpreted as illustrative and not in a limiting sense.

What is claimed is:

1. Apparatus for controlling at least two signal devices for energization by an electrical source comprising:

means for repeatedly producing different first and second concurrent digital cycles each on an output line wherein each digital cycle includes a sequence of alternating pulses and spaces, each cycle having at least two pulses that differ in duration with respect to each other and having at least two spaces that differ in duration with respect to each other wherein said means for producing digital cycles includes memory means for storing the digital cycles with each of the digital cycles including a plurality of digital values representative of the duration of the pulses and spaces, means for producing the digital cycles in different modes in response to a mode input, and counter means for addressing said memory means in a predetermined sequence, said memory means successively supplying the digital values in sequence to said output line;

means connected to the output line and responsive to said means for producing the digital cycles for applying electrical energization from the electrical source to each one of the signal devices concurrently in accordance with the pulses in the digital cycles and for not applying electrical energization from the electrical source to the signal devices in accordance with the spaces in the digital cycles; and wherein said means for producing the digital cycles includes an oscillator having an alterable repetition rate, and means responsive to the oscillator for concurrently generating a control signal for selectively altering the repetition rate of the oscillator at least once during each digital cycle.

2. Apparatus as set forth in claim 1 wherein said memory means includes means for storing a reset bit and having an output connected to said counter means for the reset bit to reset said counter means when each digital cycles is completed.

3. Apparatus as set forth in claim 1 wherein each of the pulses and spaces in each cycle exceed one-tenth second in duration.

4. Apparatus as set forth in claim 1 wherein said means for producing the digital cycles includes means for producing the digital cycles in different modes in response to a mode input, and said means for applying electrical energization requires power for its own operation from the electrical source, the apparatus further comprising first switch means for connecting the electrical source to said means for applying electrical energization, said means for producing digital cycles operating in a first mode when said first switch means is on.

5. Apparatus as set forth in claim 4 further comprising mode shifting switch means for selectively connecting the electrical source to the mode input to operate said means for producing digital cycles in a different mode, and power being supplied through said mode shifting switch means to said means for applying electrical energization when said mode shifting switch means is on.

6. Apparatus as set forth in claim 5 further comprising unidirectional conduction means for connecting said mode shifting switch means to said means for applying, to independently power the operation of said means for applying through said mode shifting switch means when it shifts to tile different mode.

7. Apparatus as set forth in claim 1 wherein said means for producing the digital signals includes an electronic memory and said means for applying electrical energization includes a buffer circuit fed by said electronic memory and a relay fed by said buffer circuit for controlling the signal device.

8. Apparatus as set forth in claim 1 wherein said means for producing the digital signals includes an electronic memory with address inputs, the apparatus further comprising at least one mode switch coupled to at least one of the address inputs.

9. Apparatus for controlling a signal device for energization by an electrical source comprising:
means for repeatedly producing digital cycles on an output line wherein each digital cycle includes a sequence of alternating pulses an spaces, each cycle having at lest two pulses that differ in duration with respect to each other and having at least two spaces that differ in duration with respect to each other;
means connected to the output line and responsive to said means for producing the digital cycles for applying electrical energization from the electrical source to the signal device in accordance with the pulses in the digital cycles and for not applying electrical energization from the electrical source to the signal device in accordance with the spaces in the digital cycles; and
wherein said means for producing digital cycles includes an oscillator having an alterable repetition rate, and means responsive to the oscillator for concurrently generating a control signal for selectively altering the repetition rate of the oscillator at least once during each digital cycle.

10. Apparatus for controlling a signal device for energization by an electrical source comprising:
means for repeatedly producing digital cycles on an output line wherein each digital cycle includes a sequence of alternating pulses and spaces, each cycle having at least two differing subperiods, each subperiod including a pulse and a space and every subperiod exceeding one-tenth second; and
means connected to the output line and responsive to said means for producing digital cycles for applying electrical energization from the electrical source to the signal device in accordance with the pulses i the digital cycles; and
wherein said means for producing digital cycles includes an oscillator having an alterable repetition rate and means responsive to the oscillator for concurrently generating a control signal for selectively altering the repetition rate of the oscillator at least once during each digital cycle.

11. Apparatus for controlling electrical energization of a signal device by an electrical source, the circuit comprising:
sequencing means for producing a sequential electrical output, said sequencing means including a counter including an oscillator having an alterable repetition rate establishing a rate of counting by the counter;
memory means responsive to the sequential electrical output from said sequencing means for generating a pattern of signals having pulses or spaces of different duration, said memory means including means for concurrently generating a control signal for selectively altering the repetition rate of the oscillator at least once as the pattern is produced;
mode select means connected to said memory means for selecting one of a plurality of patterns to be generated; and
means connected to the memory means for repeatedly energizing the signal device from the electrical source in accordance with the pattern of signals.

12. Apparatus as set forth in claim 11 wherein said memory means includes means for concurrently generating a control signal for resetting the sequencing means, whereby the pattern of signals is repeated.

13. Apparatus as set forth in claim 11 wherein said memory means also includes means for concurrently generating a control signal for resetting the sequencing means, whereby the pattern of signals is repeated.

14. Apparatus as set forth in claim 11 wherein the pattern of signals comprises a cycle with on periods of differing lengths.

15. Apparatus as set forth in claim 11 wherein the pattern of signals comprises a cycle with off periods of unequal lengths.

* * * * *